United States Patent
Meng et al.

(10) Patent No.: US 11,681,872 B2
(45) Date of Patent: Jun. 20, 2023

(54) LANGUAGE SEQUENCE LABELING METHOD AND APPARATUS, STORAGE MEDIUM, AND COMPUTING DEVICE

(71) Applicant: TENCENT TECHNOLOGY (SHENZHEN) COMPANY LIMITED, Shenzhen (CN)

(72) Inventors: Fandong Meng, Shenzhen (CN); Yijin Liu, Shenzhen (CN); Jinchao Zhang, Shenzhen (CN); Jie Zhou, Shenzhen (CN); Jinan Xu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 114 days.

(21) Appl. No.: 17/355,120

(22) Filed: Jun. 22, 2021

(65) Prior Publication Data

US 2021/0319181 A1 Oct. 14, 2021

Related U.S. Application Data

(63) Continuation of application No. PCT/CN2020/093679, filed on Jun. 1, 2020.

(30) Foreign Application Priority Data

Jun. 5, 2019 (CN) .......................... 201910486896.1

(51) Int. Cl.
*G06F 40/289* (2020.01)
*G06F 40/117* (2020.01)
(Continued)

(52) U.S. Cl.
CPC .......... *G06F 40/289* (2020.01); *G06F 40/117* (2020.01); *G06F 40/126* (2020.01); *G06N 3/044* (2023.01); *G06F 40/58* (2020.01)

(58) Field of Classification Search
CPC .... G06F 40/289; G06F 40/117; G06F 40/126; G06F 40/58; G06F 40/279; G06F 40/30;
(Continued)

(56) References Cited

U.S. PATENT DOCUMENTS

2017/0308790 A1 10/2017 Nogueira et al.

FOREIGN PATENT DOCUMENTS

CN 107025219 A 8/2017
CN 108717409 A 10/2018
(Continued)

OTHER PUBLICATIONS

The World Intellectual Property Organization (WIPO) International Search Report for PCT/CN2020/093679 dated Aug. 27, 2020 6 Pages (including translation).
(Continued)

*Primary Examiner* — Thierry L Pham
(74) *Attorney, Agent, or Firm* — Anova Law Group PLLC

(57) ABSTRACT

A language sequence labeling method and includes: reading a first embedding representation of a language sequence, the first embedding representation including a character-level word embedding representation, a pre-trained word embedding representation, and a global word embedding representation of the language sequence, the global word embedding representation referring to a global context representation of the language sequence; performing first depth transformation (DT) encoding on the first embedding representation based on a first DT recurrent neural network (RNN), to output a first hidden-layer state representation corresponding to each word in the language sequence; and decoding the first hidden-layer state representations of the language sequence, to obtain a labeling result of one or more elements in the language sequence.

20 Claims, 9 Drawing Sheets

(51) Int. Cl.
*G06F 40/126* (2020.01)
*G06N 3/044* (2023.01)
*G06F 40/58* (2020.01)

(58) Field of Classification Search
CPC ..... G06F 40/151; G06F 40/295; G06N 3/044; G06N 3/045; G06N 3/08; G06N 3/049
USPC .......................................................... 704/9
See application file for complete search history.

(56) References Cited

FOREIGN PATENT DOCUMENTS

| | | |
|---|---|---|
| CN | 108829818 A | 11/2018 |
| CN | 110196967 A | 9/2019 |

OTHER PUBLICATIONS

Matthew E. Peters et al., "Semi-supervised sequence tagging with bidirectional language models," in ACL, 2017. 10 pages.

Alan Akbik et al., "Contextual String Embeddings for Sequence Labeling," Proceedings of the 27th International Conference on Computational Linguistics, pp. 1638-1649, Aug. 2018. 12 pages.

Razvan Pascanu et al., "How to Construct Deep Recurrent Neural Networks," in ICLR, 2014. 13 pages.

Antonio Valerio Miceli Barone et al., "Deep architectures for neural machine translation," in WMT, 2017. 9 pages.

Mingxuan Wang et al., "Deep Neural Machine Translation with Linear Associative Unit," in ACL, 2017. 10 pages.

Dzmitry Bahdanau et al., "Neural Machine Translation by Jointly Learning to Align and Translate," in ICLR, 2015. 15 pages.

Minh-Thang Luong et al., "Effective Approaches to Attention-based Neural Machine Translation," in EMNLP, 2015 10 pages.

The Japan Patent Office (JPO) Notification of Reasons for Refusal for Application No. 2021-539998 dated Aug. 1, 2022 5 pages (including translation).

Marek Rei et al., "Attending to Characters in Neural Sequence Labeling Models," Proceedings of Coling 2016, Dec. 17, 2016, pp. 309-318. 10 pages.

Ling Luo et al., "An attention-based BiLSTM-CRF approach to document level chemical named entity recognition," Bioinformatics, 34(8), Oxford University Press, Nov. 24, 2017, pp. 1381-1388. 8 pages.

Dong, et al., "Deep learning for named entity recognition on Chinese electronic medical records: Combining deep transfer learning with multitask bi-directional LSTM RNN", Plos One, May 2, 2019 16 pages.

LANGUAGE SEQUENCE LABELING METHOD AND APPARATUS, STORAGE MEDIUM, AND COMPUTING DEVICE

CROSS-REFERENCES TO RELATED APPLICATIONS

This application is a continuation application of PCT Patent Application No. PCT/CN2020/093679, entitled "METHOD AND APPARATUS FOR LANGUAGE SEQUENCE LABELING, STORAGE MEDIUM, AND COMPUTING DEVICE" and filed on Jun. 1, 2020, which claims priority to Chinese Patent Application No. 201910486896.1, entitled "SEQUENCE LABELING METHOD AND APPARATUS BASED ON DEPTH TRANSFORMATION ARCHITECTURE" and filed with the China National Intellectual Property Administration on Jun. 5, 2019, the entire contents of both of which are incorporated herein by reference.

FIELD OF THE TECHNOLOGY

Embodiments of the present disclosure relate to the field of data processing technologies, and specifically, to a language sequence labeling method and apparatus, a storage medium, and a computing device.

BACKGROUND OF THE DISCLOSURE

Natural language processing (NLP), as an important direction in the field of computer science and the field of artificial intelligence, studies various theories and methods that enable effective communication between humans and computers in natural language. NLP is a science that integrates linguistics, computer science, and mathematics. Therefore, studies in this field relate to natural languages, that is, languages used by people in daily life, and NLP is closely related to linguistic studies. The NLP technology generally includes technologies such as text processing, semantic understanding, machine translation, robot question and answer, and knowledge graph.

Sequence labeling is the basic work of NLP, and also a challenging issue in NLP. The sequence labeling mainly includes part-of-speech labeling, named entity recognition, and the like. For example, a main task of the named entity recognition is to recognize proper nouns such as a person name, a place name, and an organization name and meaningful phrases such as time and date in text. A sequence labeling task is an important part of information extraction, and its effect has great impact on machine translation, intelligent dialog system, and the like.

Currently, main models of sequence labeling include a common machine learning model and a neural network model. In recent years, compared with the machine learning model, the neural network model can achieve a better effect in the sequence labeling task with assistance of a small number of artificial features.

However, in the related art, a transformation process between states of adjacent hidden layers is relatively shallow and cannot extract rich linguistic features. In addition, in the related art, a position of each word in a language sequence cannot adequately represent global information, making it difficult to accurately predict a current word.

SUMMARY

In view of this, embodiments of the present disclosure provide a language sequence labeling method and apparatus, a storage medium, and a computing device.

According to an aspect of the embodiments of the present disclosure, a language sequence labeling method is provided, and is performed by a computing device, the method including: reading a first embedding representation of a language sequence, the first embedding representation including a character-level word embedding representation, a pre-trained word embedding representation, and a global word embedding representation of the language sequence, the global word embedding representation referring to a global context representation of the language sequence; performing first depth transformation (DT) encoding on the first embedding representation based on a first DT recurrent neural network (RNN), to output a first hidden-layer state representation corresponding to each word in the language sequence; and decoding the first hidden-layer state representations of the language sequence, to obtain a labeling result of one or more elements in the language sequence.

According to another aspect of the embodiments of the present disclosure, a language sequence labeling apparatus is provided, the apparatus including: a sequence labeling encoder, including: a first reading module, configured to read a first embedding representation of a language sequence, the first embedding representation including a character-level word embedding representation, a pre-trained word embedding representation, and a global word embedding representation of the language sequence, the global word embedding representation referring to a global context representation of the language sequence; a first DT module, configured to perform first DT encoding on the first embedding representation based on a first DT RNN, to output a first hidden-layer state representation corresponding to each word in the language sequence; and a sequence labeling decoder, configured to decode the first hidden-layer state representations of the language sequence, to obtain a labeling result of one or more elements in the language sequence.

According to another aspect of the embodiments of the present disclosure, a non-transitory computer-readable storage medium is provided, storing computer program instructions, the computer program instructions, when executed by a processor, causing the processor to perform: reading a first embedding representation of a language sequence, the first embedding representation including a character-level word embedding representation, a pre-trained word embedding representation, and a global word embedding representation of the language sequence, the global word embedding representation referring to a global context representation of the language sequence; performing first depth transformation (DT) encoding on the first embedding representation based on a first DT recurrent neural network (RNN), to output a first hidden-layer state representation corresponding to each word in the language sequence; and decoding the first hidden-layer state representations of the language sequence, to obtain a labeling result of one or more elements in the language sequence.

According to another aspect of the embodiments of the present disclosure, a computing device is provided, the computing device including a processor and a memory storing a computer program, and the computer program being configured to, when executed on the processor, cause the processor to perform: reading a first embedding representation of a language sequence, the first embedding representation including a character-level word embedding representation, a pre-trained word embedding representation, and a global word embedding representation of the language sequence, the global word embedding representation referring to a global context representation of the language sequence; performing first depth transformation (DT) encoding on the first embedding representation based on a first DT recurrent neural network (RNN), to output a first hidden-layer state representation corresponding to each word in the language sequence; and decoding the first hidden-layer state representations of the language sequence, to obtain a labeling result of one or more elements in the language sequence.

BRIEF DESCRIPTION OF THE DRAWINGS

Embodiments of the present disclosure are now described in more detail with reference to the accompanying drawings.

DESCRIPTION OF EMBODIMENTS

Descriptions below provide specific details for understanding and implementing various embodiments of the present disclosure. A person skilled in the art is to understand that technical solutions of the embodiments of the present disclosure may be implemented without some of the details. In some cases, some well-known structures and functions are not shown or described in detail to avoid unnecessary ambiguities in the description of the embodiments of the present disclosure. Terms used in the embodiments of the present disclosure are understood in a broadest proper manner even if the terms are used with reference to specific embodiments of the embodiments of the present disclosure.

In the embodiments of the present disclosure, language sequence labeling may be used as an underlying processing application, and may be used for resolving problems such as Chinese word segmentation, part-of-speech labeling, and named entity recognition. A language sequence labeling task is an important part of information extraction, and may be specifically applied to machine translation, an intelligent dialog system, and the like. The named entity recognition is an important basic tool in application fields such as information extraction, a question and answer system, syntax analysis, and machine translation.

Figure 1A:
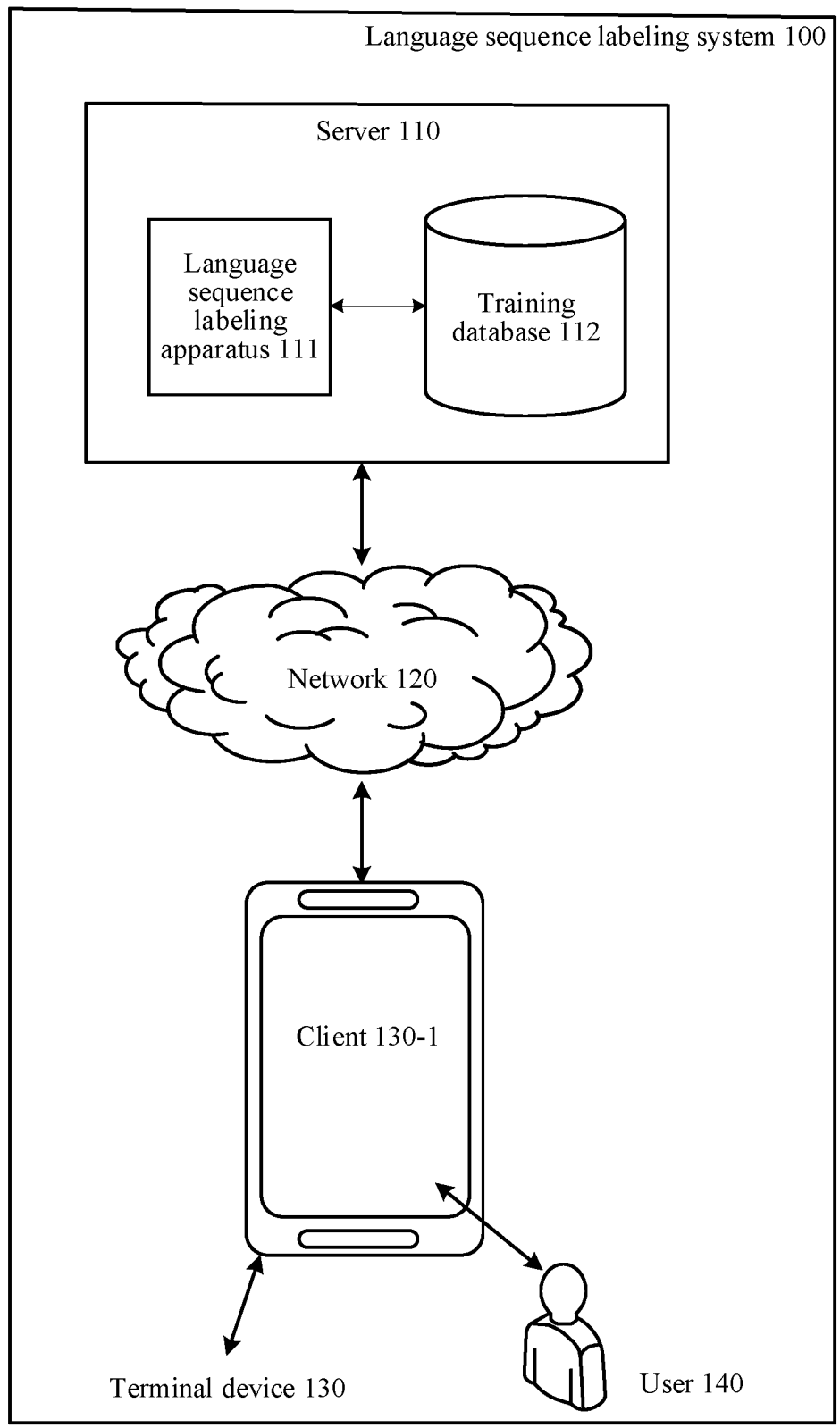
FIG. 1A is a schematic structural diagram of an implementation environment involved in an embodiment of the present disclosure.

FIG. 1A is a schematic structural diagram of an implementation environment involved in an embodiment of the present disclosure. As shown in FIG. 1, a language sequence labeling system 100 includes a server 110, a network 120, a terminal device 130, and a user 140. The server 110 includes a processor and a memory. A method embodiment in the present disclosure is performed by a processor executing instructions stored in the memory. Specifically, the server 110 includes a language sequence labeling apparatus 111 and a training database 112. A client 130-1 is installed on the terminal device 130.

The client 130-1, as an application program for receiving a language sequence, can receive voice or text entered by the user, and obtain a to-be-labeled language sequence from the voice or the text. Then the terminal device 130 sends the to-be-labeled language sequence to the server 110, and the language sequence labeling apparatus 111 in the server 110 labels and analyzes the language sequence.

According to the method described in one embodiment of the present disclosure, the training database 112 stores a pre-trained word vector table. The language sequence labeling apparatus 111 obtains a pre-trained word vector from the training database 112 for forming a first embedding representation and a second embedding representation. The language sequence labeling apparatus 111 obtains a labeling result of the language sequence by constructing a DT RNN, understands an intention of the user according to the labeling result, and determines a message to be returned to the terminal device 130, so as to display the message on the client 130-1, to achieve human-machine interaction. The labeling result may be labeled part-of-speech for each word in the language sequence, recognized/labeled named entity in the language sequence, translated sequence in another language, etc.

The server 110 may be one server, or a server cluster that includes a plurality of servers, or a cloud computing service center. The network 120 may connect the server 110 and the terminal device 130 in a wireless or wired manner. The terminal device 130 may be an intelligent terminal, including a smartphone, a tablet computer, a laptop portable computer, or the like.

Figure 1B:
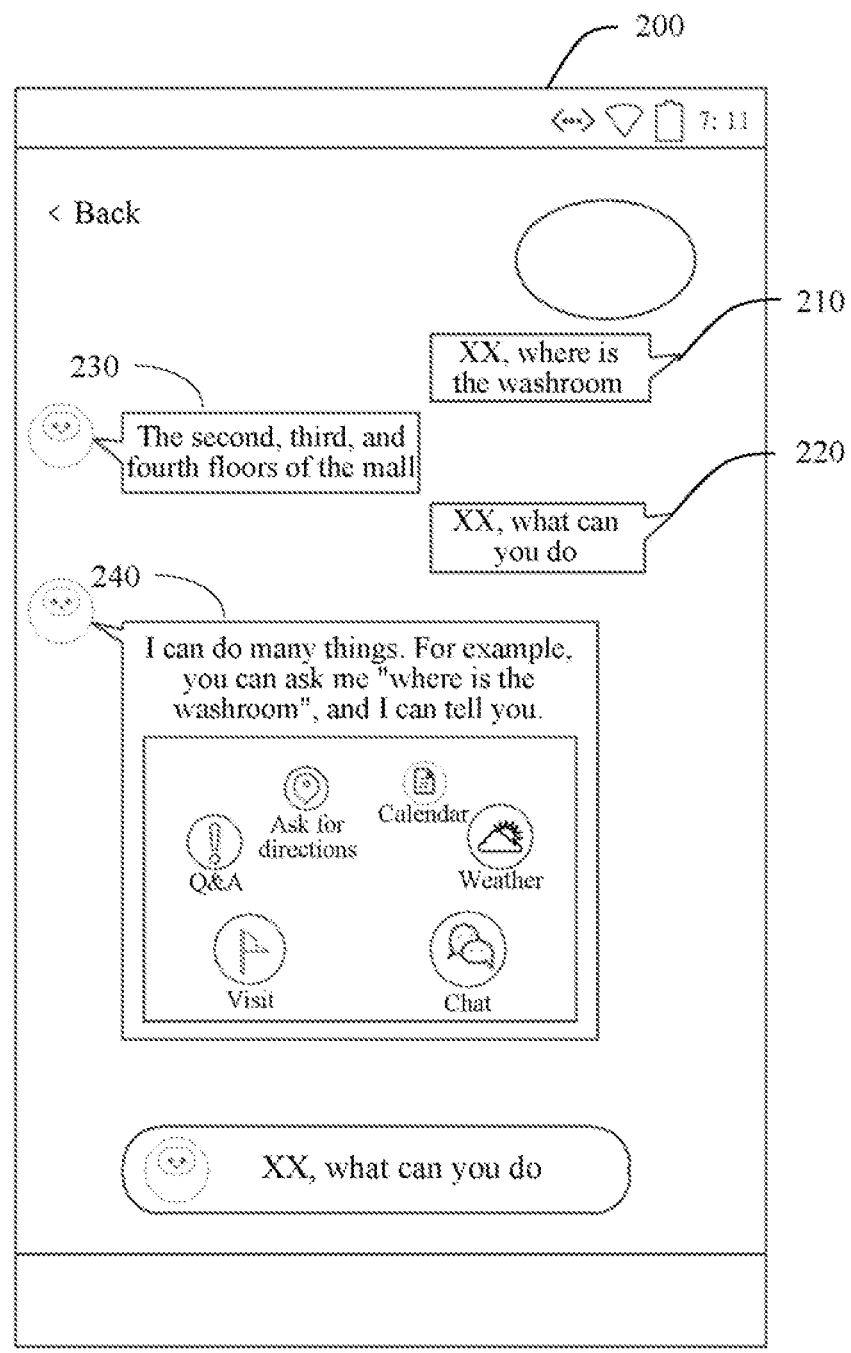
FIG. 1B is a schematic diagram of an application scenario in which language sequence labeling is used as an underlying technology according to an embodiment of the present disclosure.

FIG. 1B schematically shows an application scenario of an intelligent dialog system to which one embodiment of the present disclosure is applied as an underlying technology, and specifically shows a human-machine interaction interface 200 therein. In the interaction interface 200, the user may enter a language sequence including voice or text, as shown by 210 and 220. A machine can understand an intention of the user, for example, what a question of the user is, by performing, at a backend, sequence labeling analysis on a language sequence such as 210 "Where is the washroom" entered by the user. Corresponding replies provided by the machine to the question of the user are shown by 230 and 240. For the language sequence 210, providing the corresponding reply 230 "at the second, third, and fourth floors of the mall" enables an intelligent dialog between the machine and the user. As can be understood by a person skilled in the art, one embodiment of the present disclosure may further be applied to a variety of other scenarios that require analysis of the language sequence.

A sequence labeling method refers to classifying each element in a linear sequence. For example, a specific label in a label set $Y=y_1, y_2, \ldots, y_n$ is added to each element in a sequence $X=x_1, x_2, \ldots, x_n$.

For example, for an entered language sequence: "Einstein was born in Germany", in a part-of-speech analysis task, part-of-speech labels are added to elements, and a result is outputted: Einstein [noun], was born [verb], in [preposition], Germany [noun].

In an entity recognition task, entities including a person name, a place name, an organization name, a proper noun and the like with specific meanings in text are recognized. In the foregoing examples, labels are added to named entities, and a result is outputted: Einstein [person name], Germany [organization name].

Figure 2:
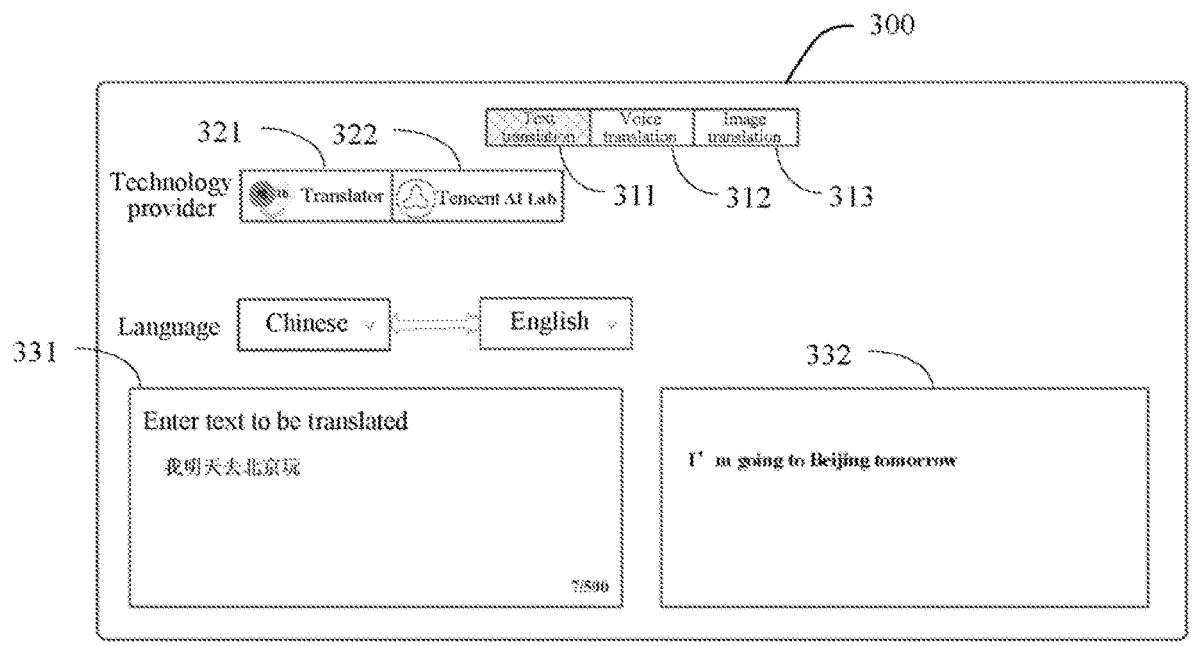
FIG. 2 is a schematic diagram of an application scenario in which language sequence labeling is used as an underlying technology according to another embodiment of the present disclosure.

FIG. 2 schematically shows an application scenario of machine translation to which one embodiment of the present disclosure is applied as an underlying technology, and specifically shows a human-machine interaction interface 300 therein. In the interface 300, a plurality of technology providers may be provided, for example, a translator 321 and a Tencent AIlab 322, to provide the user with various backend services such as text translation 311, voice translation 312, and image translation 313. For example, regarding the text translation 311, a language sequence entered in a box 331 on the left can be translated into a language sequence in a box 332 on the right. For example, in FIG. 2, Chinese "我明天去北京玩," is entered in the box 331 on the left. In this case, after processing such as sequence labeling as one of the underlying technologies is performed, "I'm going to Beijing tomorrow" is outputted in the box 332 on the right. It may be seen that the sequence labeling processing in one embodiment of the present disclosure can be used as an underlying application to analyze and process an entered language at a backend.

Figure 3:
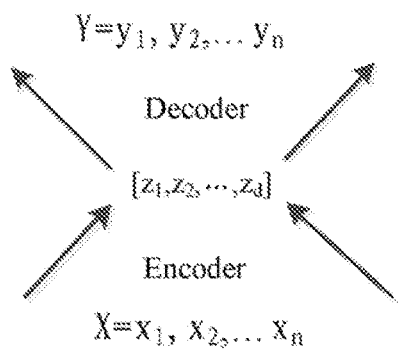
FIG. 3 is a schematic diagram of an encoder-decoder architecture for sequence labeling according to an embodiment of the present disclosure.

In a sequence labeling task, a core architecture is an encoder-decoder solution. An encoder processes variable-length input and establishes a fixed-length vector representation. A decoder generates a variable-length sequence (target sequence) based on the encoded vector representation. FIG. 3 is a schematic diagram of an encoder-decoder architecture for sequence labeling. As shown in FIG. 3, part-of-speech analysis in the sequence labeling is used as an example. A variable-length sequence inputted into an encoder is $X=x_1, x_2, \ldots, x_n$, an encoded vector representation outputted by the encoder is expressed as $[z_1, z_2, \ldots, z_d]$, and a variable-length sequence outputted by a decoder is $Y=y_1, y_2, \ldots, y_n$.

Figure 4:
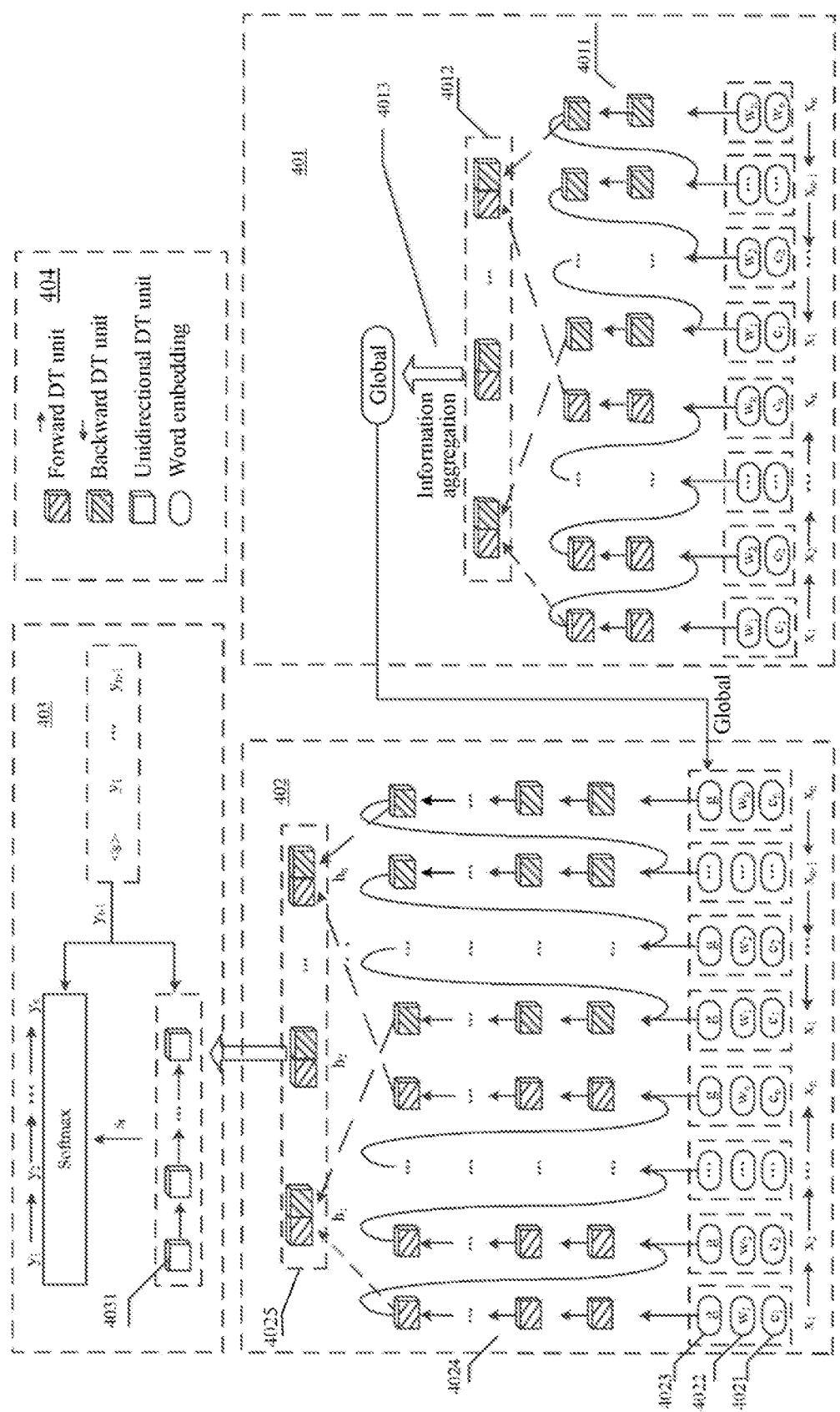
FIG. 4 is a diagram of an architecture for sequence labeling that is based on DT and on which global information enhancement has been performed according to an embodiment of the present disclosure.

FIG. 4 is a diagram of an architecture for sequence labeling that is based on DT and on which global information enhancement has been performed according to an embodiment of the present disclosure, and the architecture may be applied to a computing device, for example, the server 110 in FIG. 1A. In the architecture shown in FIG. 4, a global information encoder 401, a sequence labeling encoder 402, and a sequence labeling decoder 403 are included.

Specifically, a to-be-processed language sequence is $x_1, x_2, \ldots,$ and $x_n$, each $x_n$ identifies one word of the to-be-processed language sequence, $n=1, \ldots, N$, and N is a positive integer, representing a total number of the words in the language sequence. An example in which bidirectional DT processing is performed on the language sequence is used. The bidirectional DT processing is performed on the language sequence in forward and reverse orders: $x_1, x_2, \ldots, x_n$, and $x_n, x_{n-1}, \ldots, x_1$, respectively.

In one embodiment of the present disclosure, DT refers to increasing processing depths between a plurality of adjacent time steps by using a multi-level non-linear recurrent unit in a neural network structure. In FIG. 4, each square represents a DT recurrent neuron, briefly referred to as a DT unit. Specifically, in block 404, meanings of four identifiers are provided, including: a square with a rightward shadow identifies a forward (from left to right) DT unit, a square with a leftward shadow identifies a backward (from right to left) DT unit, a square with no shadow identifies a unidirectional DT unit, and a rounded square identifies word embedding.

The global information encoder 401 reads a second embedding representation of the language sequence $x_1, x_2, \ldots, x_n$, including character-level word embedding representations $c_1, c_2, \ldots,$ and $c_n$ and pre-trained word embedding representations $w_1, w_2, \ldots,$ and $w_n$. The character-level word embedding representation $c_n$ and the pre-trained word embedding representation $w_n$ separately correspond to a subword $x_n$ in the inputted language sequence. The character-level word embedding representation $c_n$ is a word vector that learns at a character level, and is obtained by performing convolution processing on the subword $x_n$ at the character level. The pre-trained word embedding representation $w_n$ is a word vector obtained according to the subword $x_n$ by looking up a pre-trained and stored word vector table.

In an example, a pre-trained word embedding representation $w_n$ of a text sequence "我在家" (I at home) is that: "我" (I)=[0.5486464, 0.14654642, ..., 0.4489789] is a 300-dimensional vector, and similarly, "在" (at) and "家" (home) are also each a 300-dimensional vector.

$c_n$ and $w_n$ that are corresponding to the subword $x_n$ are concatenated to form the second embedding representations of the language sequence. Then second DT encoding is performed on the second embedding representation of the read language sequence.

In one embodiment of the present disclosure, the DT is performed by constructing a DT RNN. The DT RNN includes a gated recurrent unit (GRU) improved through linear transformation. The GRU is a variant of a long short-term memory (LSTM). The LSTM is a time RNN and is suitable for processing and predicting an event with a relatively long interval and delay in a time series. An RNN is a type of recursive neural network in which sequence data is used as an input, recursion is performed in a sequence evolution direction, and all nodes (recurrent units) are connected in a chain. The GRU maintains an effect of the LSTM and has a simpler structure, which helps resolve a vanishing gradient problem in the RNN.

A DT unit 4011 in the global information encoder 401 represents a second DT RNN, including one layer of linear transformation enhanced gated recurrent units (L-GRU) and one layer of transition gated recurrent units (T-GRU). L-GRUs are adopted at a bottom layer, and T-GRUs are adopted at an upper layer. As can be understood by a person skilled in the art, other numbers of layers, typically, two to three layers, of T-GRUs may be alternatively adopted.

Specifically, the GRU includes an input layer, a hidden layer, and an output layer. In the GRU, a hidden-layer state at a moment t is expressed as follows:

$$h_t = (1-z_t) \odot h_{t-1} + \tilde{h}_t \quad (1)$$

where $\odot$ is an element-wise product, and $\tilde{h}_t$ is candidate activation, and is calculated by using the following formula:

$$\tilde{h}_t = \tan h(W_{xh}x_t + r_t \odot (W_{hh}x_{t-1})) \quad (2)$$

where W is a to-be-learned network parameter, $x_t$ is an input encoding vector of the moment t, and $r_t$ is a reset gate, where the reset gate $r_t$ and an update gate $z_t$ are calculated by using the following formulas:

$$r_t = \sigma(W_{xr} x_t + W_{hr} h_{t-1}) \quad (3)$$

$$z_t = \sigma(W_{xz} x_t + W_{hz} h_{t-1}) \quad (4)$$

where σ is a weight coefficient, so that values of $r_t$ and $z_t$ are within [0, 1].

Because the T-GRU is a type of GRU, and does not appear in the first layer of the DT RNN, the T-GRU does not have the input encoding vector $x_t$ like the GRU. The hidden-layer state at the moment t is calculated by using the following formulas:

$$h_t = (1 - z_t) \odot h_{t-1} + z_t \odot \tilde{h}_t \quad (5)$$

$$\tilde{h}_t = \tanh(r_t \odot (W_{hh} h_{t-1})) \quad (6)$$

A reset gate $r_t$ and an update gate $z_t$ are calculated by using the following formulas:

$$r_t = \sigma(W_{hr} h_{t-1}) \quad (7)$$

$$z_t = \sigma(W_{hz} h_{t-1}) \quad (8)$$

where W is a to-be-learned network parameter.

The L-GRU is another type of GRU, and the hidden-layer state of the L-GRU at the moment t is calculated by using the following formula:

$$h_t = (1 - z_t) \odot h_{t-1} + z_t \odot \tilde{h}_t \quad (9)$$

where the candidate activation $\tilde{h}_t$ is calculated by using the following formula:

$$\tilde{h}_t = \tanh(W_{xh} x_t + r_t \odot (W_{hh} h_{t-1}) + l_t \odot (W_x x_t)) \quad (10)$$

The reset gate $r_t$ and the update gate $z_t$ are the same as those in the foregoing formulas (3) and (4), and a linear transformation gate $l_t$ is calculated by using the following formula:

$$l_t = \sigma(W_{xl} x_t + W_{hl} h_{t-1}) \quad (11)$$

The second DT encoding is performed in the global information encoder 401 in a bidirectional manner. Therefore, a concatenating unit 4012 concatenates results obtained after the forward and reverse DT processing is performed on the same subword $x_n$, and reduces dimensions by using an information aggregation processing unit 4013, to obtain a global word embedding vector g. In an embodiment, information aggregation processing may include average pooling, maximum pooling, or an attention mechanism.

The sequence labeling encoder 402 enhances a language sequence embedding representation by using the global word embedding vector g outputted by the global information encoder 401. Exemplarily, the sequence labeling encoder 402 reads a first embedding representation of the language sequence, including character-level word embedding representations $c_1, c_2, \ldots,$ and $c_n$ shown by 4021, pre-trained word embedding representations $w_1, w_2, \ldots,$ and $w_n$ shown by 4022, and the global word embedding representations g shown by 4023. The character-level word embedding representation $c_n$ and the pre-trained word embedding representation $w_n$ respectively correspond to the subword $x_n$ in the inputted language sequence. $c_n$, $w_n$, and the global word embedding vector g that are corresponding to the subword $x_n$ are concatenated to form the first embedding representations of the language sequence.

Specifically, considering a language sequence $X = \{x_1, x_2, \ldots, x_n\}$ with n words, in one embodiment of the present disclosure, the sequence labeling encoder 402 first captures a representation $x_t = [c_t; w_t; g]$ of each word at the moment t by concatenating three primary embeddings $c_t$, $w_t$, and g. The character-level word embedding representation $c_t$ is obtained according to a recurrent convolutional neural network (CNN). The pre-trained word embedding representation $w_t$ is obtained by looking up a lookup table. The global word embedding representation g is a global context representation obtained through pre-encoding computation for the language sequence, that is, extracted from the bidirectional second DT RNN by using the global information encoder 401.

The sequence labeling encoder 402 then performs first DT encoding on the first embedding representation of the read language sequence based on the first DT RNN. In an embodiment, the first DT encoding is performed in a bidirectional manner. In a first DT RNN represented by a DT unit 4024, L-GRUs are adopted at a bottom layer, and T-GRUs are adopted at the remaining layers. In the example shown in FIG. 4, a number of layers of the T-GRUs adopted is usually two to five. As can be understood by a person skilled in the art, other layers of T-GRUs may alternatively be adopted. Compared with the global information encoder 401, the sequence labeling encoder 402 adopts one layer of L-GRUs.

A concatenating unit 4025 concatenates results obtained after the forward and reverse DT processing is performed on the same subword $x_n$, to obtain a first hidden-layer state representation $h_t$ corresponding to the each word.

The sequence labeling decoder 403 reads, at each moment t, from the sequence labeling encoder 402, a first hidden-layer state representation $h_t$ corresponding to a current word, and performs decoding based on label information $y_{t-1}$ at a previous moment. Specifically, the following steps are included:

First, perform, for the each word, DT on the first hidden-layer state representation of the word based on a third DT RNN, to obtain a second hidden-layer state representation $s_t$ corresponding to the each word.

Next, perform linear transformation on the second hidden-layer state representation $s_t$ and the label information $y_{t-1}$ at the previous moment, so that a number of dimensions of a hidden-layer state is equal to a number of labels:

$$l_t = s_t W_l + b_l \quad (12)$$

Finally, through a softmax operation, normalize $l_t$ as a probability distribution form. For an $i^{th}$ word, it is predicted that a probability of a label j is:

$$P(y_i = j | x_i) = \mathrm{softmax}(l_t)[j] \quad (13)$$

In this way, a label prediction result of the each word is obtained.

The sequence labeling decoder 403 adopts a unidirectional structure and performs unidirectional DT. A structure of recurrent neuron DT of the sequence labeling decoder 403 is similar to the structures of recurrent neuron DT in the global information encoder 401 and the sequence labeling encoder 402, L-GRUs are in a first layer (referring to 4031 in FIG. 4), and T-GRUs are in the remaining layers.

Figure 5:
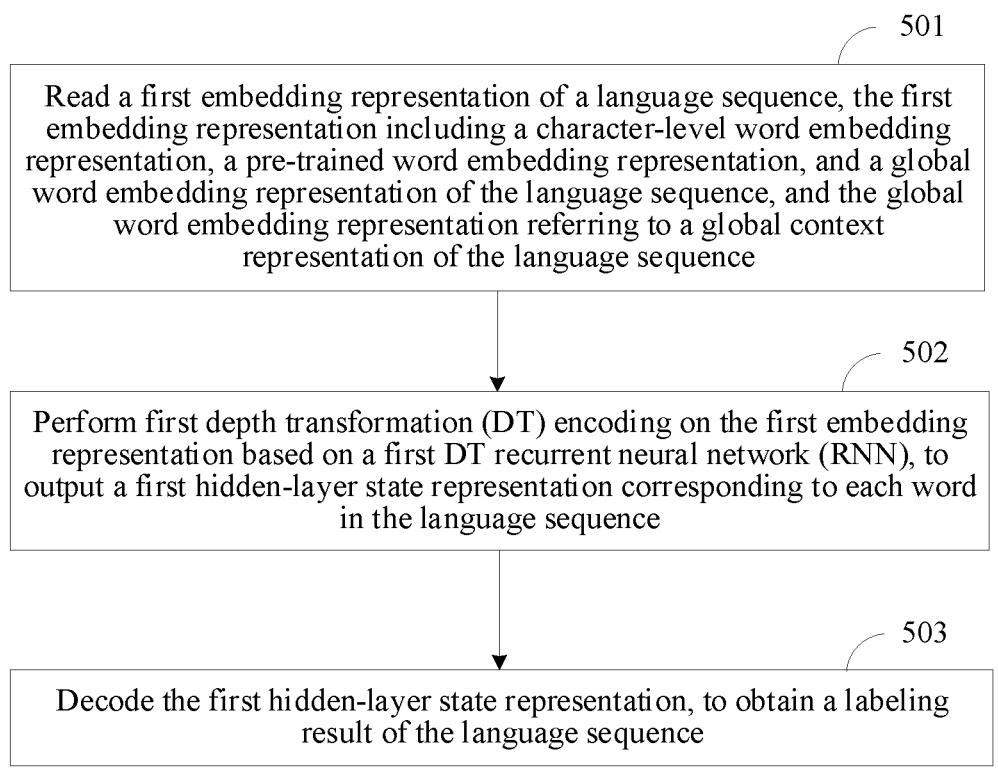
FIG. 5 is a flowchart of a language sequence labeling method according to an embodiment of the present disclosure.

FIG. 5 schematically shows a flowchart of a language sequence labeling method according to an embodiment of the present disclosure. The method is performed by a computing device such as the server 110 in FIG. 1A. The method specifically includes the following steps:

Step 501. Read a first embedding representation of a language sequence, the first embedding representation including a character-level word embedding representation, a pre-trained word embedding representation, and a global word embedding representation of the language sequence, and the global word embedding representation referring to a global context representation of the language sequence.

The first embedding representation includes a character-level word embedding representation $c_n$, a pre-trained word embedding representation $w_n$, and a global word embedding representation g of the language sequence. The character-level word embedding representation $c_n$ is a word vector that learns at a character level, and is obtained by performing convolution processing on a subword $x_n$ at the character level. The pre-trained word embedding representation $w_n$ is obtained according to the subword $x_n$ by looking up a pre-trained and stored word vector table. For each subword $x_n$, the character-level word embedding representation $c_n$, the pre-trained word embedding representation $w_n$, and the global word embedding representation g that are corresponding to the subword are concatenated. The global word embedding representation g is a global context representation obtained through pre-encoding computation for the language sequence.

Step 502. Perform first DT encoding on the first embedding representation based on a first DT RNN, to output a first hidden-layer state representation corresponding to each word in the language sequence.

In an embodiment, the first DT encoding includes: performing the first DT encoding on the first embedding representation in forward and reverse directions respectively, that is, bidirectional DT performed forward from left to right and reversely from right to left. For the bidirectional DT, DT encoding results obtained in the forward and reverse directions need to be concatenated. The DT encoding results obtained in the forward and reverse directions are concatenated, to obtain the first hidden-layer state representation corresponding to the each word.

In a network architecture of the first DT encoding, a DT unit at a bottom layer is an L-GRU, and DT units at the remaining layers are T-GRUs. In an example, a number of layers of T-GRUs adopted is usually two to five. As can be understood by a person skilled in the art, other layers of T-GRUs may alternatively be adopted.

Step 503. Decode the first hidden-layer state representation, to obtain a labeling result of the language sequence. In some embodiments, the first hidden-layer state representations of all words of the language sequence are decoded, to obtain the labeling result of one or more elements of the language sequence. The one or more elements may be word(s) and/or phrase(s) in the language sequence. In one embodiment, each word and/or phrase in the language sequence may have a labeling result. In another embodiment, just words and/or phrases belonging to one or more certain categories are labeled.

For a decoding method of this step, reference may be made to descriptions of the sequence labeling decoder 403, and details are not described herein again.

According to the foregoing embodiments, a sequence labeling method that is based on a DT architecture and on which global information enhancement has been performed is provided, and a transformation process between adjacent states of an RNN may be deepened. Meanwhile, local information of the each word is enhanced by using the global information encoder, and a more comprehensive feature representation is obtained, thereby improving prediction accuracy.

Figure 6:
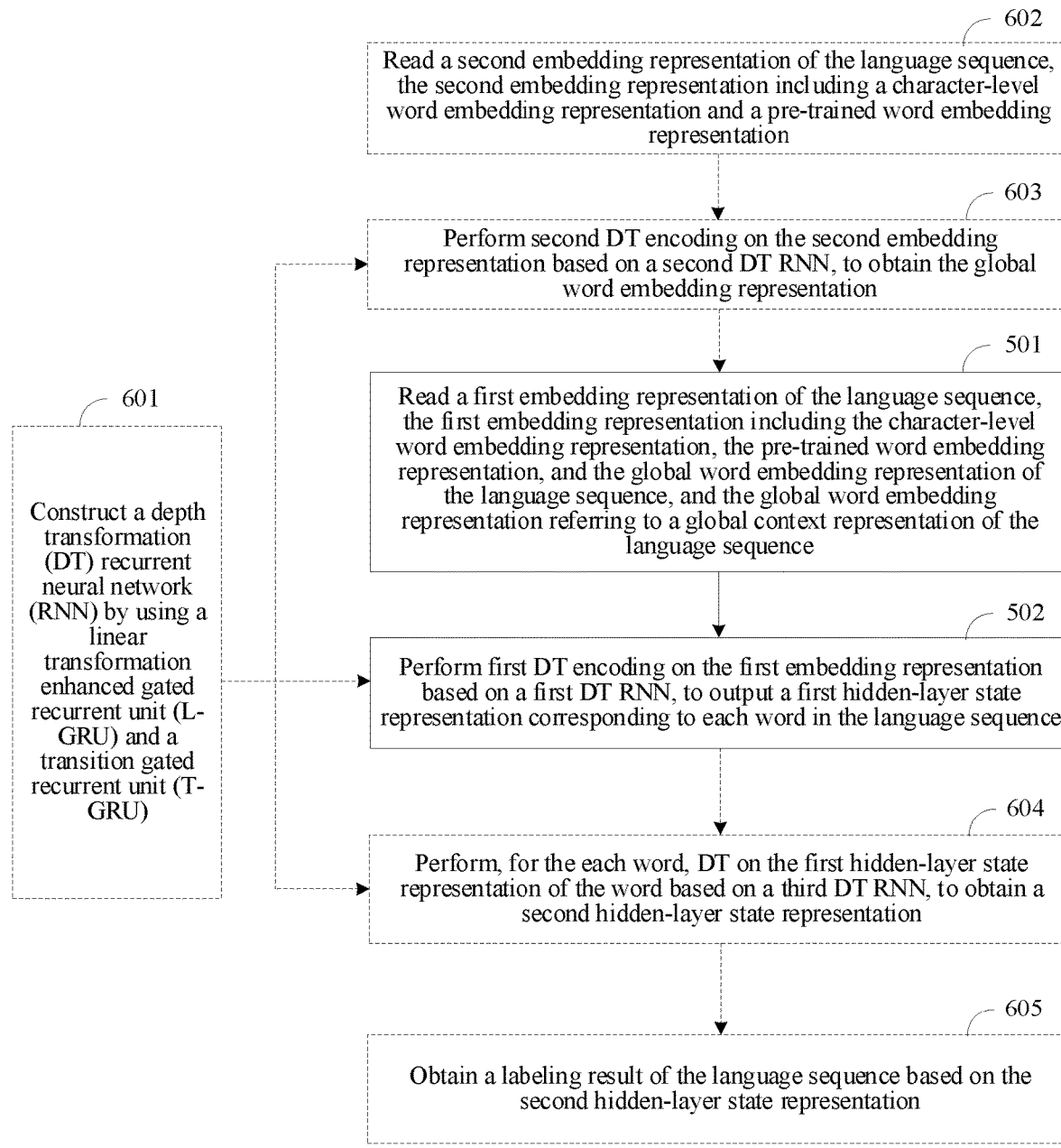
FIG. 6 is a flowchart of a language sequence labeling method according to another embodiment of the present disclosure.

FIG. 6 schematically shows a flowchart of a language sequence labeling method according to another embodiment of the present disclosure. The method is performed by a computing device such as the server 110 in FIG. 1A. Based on the procedure of the method in FIG. 5, in FIG. 6, the following steps are specifically included.

Step 601. Construct a DT RNN by using an L-GRU and a T-GRU.

In this step, the constructed DT RNN includes a plurality of layers of GRUs, where numbers of layers of L-GRUs and T-GRUs that are used are configurable. For example, the first DT RNN used in the sequence labeling encoder 402 may include one layer of L-GRUs and at least two layers of T-GRUs. The second DT RNN used in the global information encoder 401 may include one layer of L-GRUs and one layer of T-GRUs. The one layer of T-GRUs are located at a bottom layer of a network.

Step 602. Read a second embedding representation of the language sequence, the second embedding representation including a character-level word embedding representation and a pre-trained word embedding representation.

The character-level word embedding representation $c_n$ and the pre-trained word embedding representation $w_n$ respectively correspond to a subword $x_n$ in the inputted language sequence. The character-level word embedding representation $c_n$ is a word vector that learns at a character level, and is obtained by performing convolution processing on the subword $x_n$ at the character level. The pre-trained word embedding representation is a word vector obtained according to the subword $x_n$ by looking up a pre-trained and stored word vector table.

Step 603. Perform second DT encoding on the second embedding representation based on a second DT RNN, to obtain the global word embedding representation.

In an embodiment, after the second DT encoding is performed on the second embedding representation, in order to perform dimension reduction, information aggregation is performed on a result obtained after the second DT encoding, to obtain the global word embedding representation. Specifically, the second DT encoding includes performing the DT encoding on the read second embedding representation in a forward direction from left to right and a reverse direction from right to left. When performing the DT encoding in the forward direction from left to right and the reverse direction from right to left, results of the DT encoding in the forward direction and the reverse direction are concatenated, and then the information aggregation is performed. The information aggregation may include maximum pooling or average pooling.

The second DT encoding is performed through the second DT RNN including the L-GRU and the T-GRU. The L-GRU is located at the first layer of a recurrent unit in the second DT RNN, and the T-GRU is located at another layer of the recurrent unit in the DT RNN. In an embodiment, a number of layers of T-GRUs in the first DT RNN is 1. As can be understood by a person skilled in the art, other numbers of layers, such as two to three layers, of T-GRUs may exist in the second DT RNN.

After steps 501 and 502 are performed, steps 604 and 605 are performed.

Step 604. Perform, for the each word, DT on the first hidden-layer state representation of the word based on a third DT RNN, to obtain a second hidden-layer state representation.

In an embodiment of the present disclosure, the DT being performed may be unidirectional DT. For example, in the sequence labeling decoder 403 shown in FIG. 4, a unidirectional DT unit is included in 4031.

Step 605. Obtain a labeling result of the language sequence based on the second hidden-layer state representation.

In an embodiment of the present disclosure, a plurality of labels are preset, and linear transformation is performed on the second hidden-layer state representation and label information at a previous moment, to obtain a probability that the word belongs to each label. For example, a label set $Y=y_1, y_2, \ldots, y_n$ is preset. Referring to the foregoing formulas (12) and (13), a probability that each word belongs to each label in the label set Y can be obtained and used as a label prediction result of the word, that is, the labeling result of the language sequence is obtained.

Figure 7:
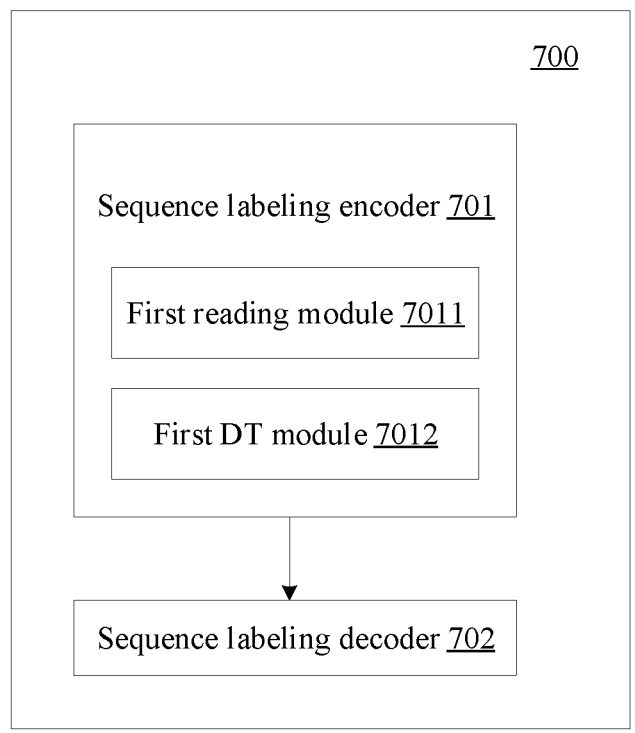
FIG. 7 is a schematic diagram of a language sequence labeling apparatus according to an embodiment of the present disclosure.

FIG. 7 is a schematic diagram of a language sequence labeling apparatus 700 according to an embodiment of the present disclosure. The apparatus 700 may be applied to a computing device such as the server 110 in FIG. 1A. The language sequence labeling apparatus 700 includes a sequence labeling encoder 701 and a sequence labeling decoder 702. The sequence labeling encoder 701 includes a first reading module 7011 and a first DT module 7012.

The first reading module 7011 is configured to read a first embedding representation of a language sequence, the first embedding representation including a character-level word embedding representation, a pre-trained word embedding representation, and a global word embedding representation of the language sequence, the global word embedding representation referring to a global context representation of the language sequence.

The first DT module 7012 is configured to perform first DT encoding on the first embedding representation based on a first DT RNN, to output a first hidden-layer state representation corresponding to each word in the language sequence.

The sequence labeling decoder 702 is configured to decode the first hidden-layer state representation, to obtain a labeling result of the language sequence.

Figure 8:
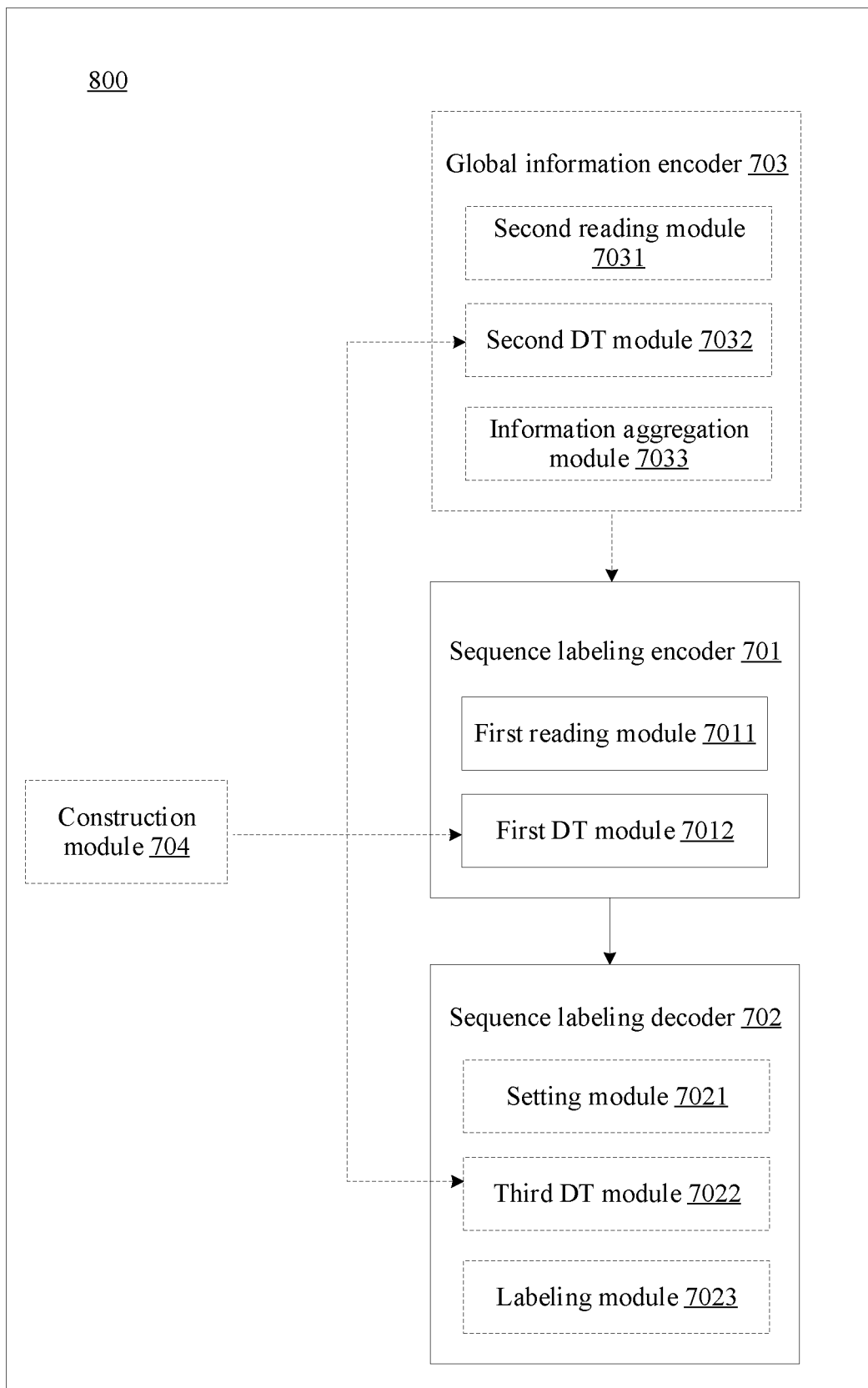
FIG. 8 is a schematic diagram of a language sequence labeling apparatus according to another embodiment of the present disclosure.

FIG. 8 is a schematic diagram of a language sequence labeling apparatus 800 according to another embodiment of the present disclosure. The apparatus 800 may be applied to a computing device such as the server 110 in FIG. 1A. Based on the apparatus shown in FIG. 7, the language sequence labeling apparatus 800 further includes a global information encoder 703.

In an embodiment, the global information encoder 703 is configured to obtain the global word embedding representation, and includes:

a second reading module 7031, configured to read a second embedding representation of the language sequence, the second embedding representation including the character-level word embedding representation and the pre-trained word embedding representation; and a second DT module 7032, configured to perform second DT encoding on the second embedding representation based on a second DT RNN, to obtain the global word embedding representation.

In an embodiment, the global information encoder 703 further includes:

an information aggregation module 7033, configured to perform information aggregation on a result obtained after the second DT encoding, to obtain the global word embedding representation.

The global information encoder 703 may perform bidirectional DT encoding, that is, perform transformation encoding from the left to the right and perform the DT encoding from the right to the left. There is no difference in the bidirectional DT encoding other than a direction of inputting a sequence.

In an embodiment, the first DT module 7012 is configured to perform the first DT encoding on the first embedding representation in forward and reverse directions respectively; and concatenate DT encoding results obtained in the forward and reverse directions, to obtain the first hidden-layer state representation corresponding to the each word.

In an embodiment, the apparatus 800 further includes:

a construction module 704, configured to construct a DT RNN by using a L-GRU and a T-GRU.

In an embodiment, the first DT RNN includes one layer of L-GRUs and at least two layers of T-GRUs.

In an embodiment, the sequence labeling decoder 702 includes:

a third DT module 7022, configured to perform, for the each word, DT on the first hidden-layer state representation of the word based on a third DT RNN, to obtain a second hidden-layer state representation; and a labeling module 7023, configured to obtain the labeling result of the language sequence based on the second hidden-layer state representation.

In an embodiment, the sequence labeling decoder 702 further includes:

a setting module 7021, configured to preset a plurality of labels.

The labeling module 7023 is configured to perform linear transformation on the second hidden-layer state representation and label information at a previous moment, to obtain a probability that the word belongs to each label.

The first DT module 7012 and the second DT module 7032 perform bidirectional DT. However, the third DT module 7022 performs unidirectional DT.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

A unidirectional transformation encoder is used as an example for description below. If L represents a transformation encoder depth, at a moment i and a depth j, a hidden-layer state of the DT encoder is calculated by using the following formulas:

$$h_i^o = LGRU(x_i, h_{i-1}^L) \tag{14}$$

$$h_i^j = TGRU^j(x_i, h_i^{j-1}) \quad 1 \leq j \leq L \tag{15}$$

After DT encoding is performed, a state corresponding to an $i^{th}$ word is $h_i \equiv h_i^L$. The DT encoding in the two directions is calculated in the same manner, and hidden-layer state representations obtained by encoding in the two directions are concatenated, so that a final encoding representation $h_i = [\vec{h_i}; \overleftarrow{h_i}]$ corresponding to the $i^{th}$ word can be obtained.

Subsequently, the second DT module 7032 performs average pooling on encoding representations of all the words, to obtain a final global representation $$g = \frac{1}{N} \sum_{i=1}^{N} h_i$$

of the entire language sequence.

Compared with the existing bidirectional LSTM model, the sequence labeling solution in the embodiments of the present disclosure exhibits a better labeling effect, and can more accurately identify a named entity, a syntax block, a part-of-speech, and other information in a sentence, thereby optimizing an existing relevant application system such as a micro dialog system.

F1 is an average indicator that represents accuracy and a return rate. The annotation indicator F1 of the sequence labeling is used as an example. Actual tests show that a value of F1 is increased in a plurality of aspects in the solution of the embodiments of the present disclosure. Table 1 schematically shows comparisons of F1 performance of various solutions in named entity recognition and syntax block recognition.

TABLE 1

| Model | Named entity recognition F1 | Syntax block recognition F1 |
|---|---|---|
| Related art | 91.64 | 95.29 |
| One embodiment of the present disclosure | 91.96 (+0.32) | 95.43 (+0.14) |
| One embodiment of the present disclosure + BERT | 93.47 (+1.83) | 97.30 (+2.01) |

As shown in Table 1, for the named entity recognition in the sequence labeling, in the solution of one embodiment of the present disclosure, the value of F1 is increased by 0.32 based on 91.64 in the related art, and for the syntax block recognition in the sequence labeling, the value of F1 is increased by 0.14 based on 95.29 in the related art.

Moreover, performance is further improved by fusing Transformer-based bidirectional encoder representations from Transformers (BERT) based on one embodiment of the present disclosure.

TABLE 2

| Model | Number of parameters | Named entity recognition F1 |
|---|---|---|
| Stacked RNN | 8.4 M | 90.94 |
| One embodiment of the present disclosure | 7.4 M | 91.96 (+1.02) |

Table 2 shows performance comparisons with the stacked RNN. First, although the stacked RNN can process an extremely deep structure, a transformation depth between successive hidden-layer states at a word level is still relatively shallow. Second, in the stacked RNN, the hidden-layer state along an axis of a sequence is simply fed to a corresponding position of a higher layer, that is, only a position sensing feature is transmitted in a depth architecture.

However, in one embodiment of the present disclosure, each internal state at a word position in a global encoder is transformed into a vector of a fixed size. Compared with the stacked RNN, such a context sensing representation provides more general and informative features of a sentence. To obtain a more rigorous comparison, the stacked RNN with parameter values similar to those in one embodiment of the present disclosure is used. According to the numerically stacked RNN in Table 2, there is still a big gap between the stacked RNN and the technical solution of one embodiment of the present disclosure. As shown in Table 2, one embodiment of the present disclosure achieves better performance than the stacked RNN by using a smaller number of parameters. Referring to the column of named entity recognition F1 in the figure, a value of F1 in one embodiment of the present disclosure is 91.96, which is 1.02 higher than that of the stacked RNN. Therefore, it is confirmed that the technical solution of one embodiment of the present disclosure can effectively utilize global information to learn more useful representations of a sequence labeling task.

TABLE 3

| Model ablation experiment | | | | |
|---|---|---|---|---|
| Character-level word embedding representation | Pre-trained word embedding representation | Global word embedding representation | DT RNN | Named entity recognition F1 |
| √ | √ | √ | √ | 91.96 |
| × | √ | √ | √ | 90.94 |
| √ | × | √ | √ | 88.59 |
| √ | √ | × | √ | 91.60 |
| √ | √ | √ | × | 91.42 |

Table 3 shows results of the model ablation experiment, that is, values of F1 for a named entity recognition task that are obtained when respectively removing one of the character-level word embedding representation (that is, 4021 in FIG. 4), the pre-trained word embedding representation (that is, 4022 in FIG. 4), the global word embedding representation (that is, 4023 in FIG. 4), and the DT RNN (that is, 4024 in FIG. 4) and retaining the other three components.

It can be seen that when all the four parts exist, the highest value of F1 is 91.96, which is higher than 90.94 when a character-level CNN is ablated, 88.59 in a case that a pre-trained word vector is ablated, 91.60 when the global information is ablated, and 91.42 when a DT recurrent network is ablated. Therefore, performance of the technical solution of one embodiment of the present disclosure is higher than that of other ablation solutions.

Although the global word embedding representation is used in one embodiment of the present disclosure to enhance an input of a sequence labeling encoder, global word embedding information may be enhanced in another manner such as being used as an input of a sequence labeling decoder or being used as an input of a softmax classification layer.

However, the technical solution in the embodiments of the present disclosure has the best effect. After being concatenated, the global word embedding representation, a multi-granularity character-level word embedding representation, and the pre-trained word embedding representation are used as the input of the sequence labeling encoder. After complex combination calculations, a more specific and richer representation can be learned for each word position, thereby improving an overall effect of the model. In the latter two solutions, the global information and a feature space of another hidden-layer state are relatively similar.

Figure 9:
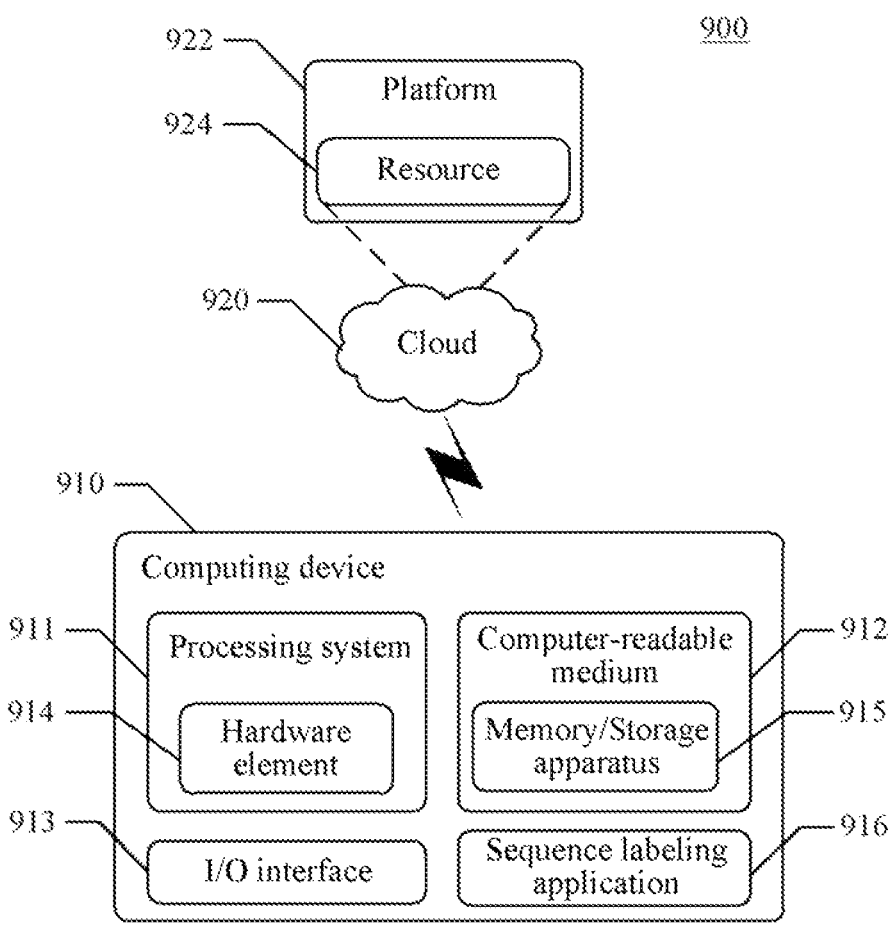
FIG. 9 shows an exemplary system including an exemplary computing device that represents one or more systems and/or devices that can implement various technologies described herein.

FIG. 9 shows an exemplary system 900, including an exemplary computing device 910 that represents one or more systems and/or devices that can implement various technologies described herein. The computing device 910 may be, for example, a server of a service provider, a device associated with a client (for example, a client device), a system-on-a-chip, and/or any other suitable computing device or computing system. The language sequence labeling apparatus 700 in FIG. 7 or the language sequence labeling apparatus 800 in FIG. 8 may be in a form of the computing device 910. Alternatively, the language sequence labeling apparatus 700 and the language sequence labeling apparatus 800 each may be implemented as a computer program in a form of a sequence labeling application 916.

The exemplary computing device 910 shown in the figure includes a processing system 911, one or more computer-readable media 912, and one or more I/O interfaces 913 communicatively coupled to each other. Although not shown in the figure, the computing device 910 may further include a system bus or another data and command transmission system, which couples various components with each other. The system bus may include any one or a combination of different bus structures such as a memory bus or memory controller, a peripheral bus, a universal serial bus, and/or a processor or a local bus that uses any one of various bus architectures. Various other examples such as control and data lines are also contemplated.

The processing system 911 represents a function of using hardware to perform one or more operations. Therefore, the processing system 911 is illustrated as including a hardware element 914 that can be configured as a processor, a functional block, or the like. This may include an application-specific integrated circuit (ASIC) implemented in hardware or another logic device formed by using one or more semiconductors. The hardware element 914 is not limited by a material from which the hardware element is formed or a processing mechanism adopted therein. For example, the processor may include (a plurality of) semiconductors and/or transistors (for example, an electronic integrated circuit (IC)). In such a context, processor-executable instructions may be electronically executable instructions.

The computer-readable medium 912 is illustrated as including a memory/storage apparatus 915. The memory/storage apparatus 915 represents a memory/storage capacity associated with one or more computer-readable media. The memory/storage apparatus 915 may include a volatile medium (for example, a random access memory (RAM)) and/or a non-volatile medium (for example, a read-only memory (ROM), a flash memory, an optical disc, or a magnetic disk). The memory/storage apparatus 915 may include a non-removable medium (for example, a RAM, a ROM, or a solid state hard drive) and a removable medium (for example, a flash memory, a removable hard disk drive, or an optical disc). The computer-readable medium 912 may be configured in various other manners as described further below.

The one or more I/O interfaces 913 represent functions of allowing a user to input commands and information to the computing device 910, and in one embodiment, allowing information to be presented to the user and/or other components or devices using various input/output devices. Examples of input devices include a keyboard, a cursor control device (for example, a mouse), a microphone (for example, used for voice input), a scanner, touch functionality (for example, capacitive or other sensors that are configured to detect physical touch), and a camera (for example, visible or invisible wavelengths such as infrared frequencies can be used to detect movement that does not involve touch as a gesture), and so forth. Examples of output devices include a display device (for example, a monitor or a projector), a speaker, a printer, a network card, a tactile response device, and the like. Therefore, the computing device 910 may be configured in various manners as described further below to support user interaction.

The computing device 910 further includes the sequence labeling application 916. The sequence labeling application 916 may be, for example, a software instance of the language sequence labeling apparatus 700 and the language sequence labeling apparatus 800 described in FIG. 5, and is combined with other elements in the computing device 910 to implement the technologies described herein.

This specification may describe various technologies in a general context of software hardware elements or program modules. Generally, the modules include a routine, a program, an object, an element, a component, a data structure, and the like for executing a particular task or implementing a particular abstract data type. Terms "module", "function", and "component" used herein generally represent software, hardware, or a combination thereof. Features of the technologies described herein are irrelevant to a platform, which means that the technologies can be implemented on various computing platforms with various processors.

Implementations of the described modules and technologies may be stored on a specific form of computer-readable medium or transmitted across a specific form of computer-readable medium. The computer-readable medium may include various media accessible by the computing device 910. By way of example and not limitation, the computer-readable medium may include a "computer-readable storage medium" and a "computer-readable signal medium".

Contrary to mere signal transmission, a carrier or a signal, the "computer-readable storage medium" refers to a medium and/or device capable of permanently storing information, and/or a tangible storage apparatus. Therefore, the computer-readable storage medium is a non-signal carrying medium. The computer-readable storage medium includes volatile and non-volatile, or removable and non-removable media, and/or hardware such as a storage device implemented with methods or technologies suitable for storing information (for example, computer-readable instructions, a data structure, a program module, a logic element/circuit, or other data). Examples of the computer-readable storage medium may include, but are not limited to, a RAM, a ROM, an EEPROM, a flash memory or another memory technology, a CD-ROM, a digital versatile disk (DVD) or another optical storage apparatus, hardware, a cartridge tape, a magnetic tape, a magnetic disk storage apparatus or another magnetic storage device, or another storage device, a tangible medium or a product that is suitable for storing expected information and accessible by a computer.

The "computer-readable signal medium" refers to a signal-carrying medium configured to send instructions to hardware of the computing device 910 through a network. The signal medium may typically embody computer-readable instructions, a data structure, a program module, or other data in a modulated data signal such as a carrier, a data signal, or another transmission mechanism. The signal medium may further include any information transmission medium. The term "modulated data signal" refers to a signal that encodes information in the signal in such a manner to set or change one or more of features of the signal. By way of example and not limitation, a communication medium includes a wired medium such as a wired network or a directly connected wired medium and wireless mediums such as acoustic, RF, infrared, and other wireless mediums.

As described above, the hardware element 914 and the computer-readable medium 912 represent instructions, a module, programmable device logic, and/or fixed device logic implemented in a form of hardware, which may be configured to implement at least some aspects of the technologies described herein in some embodiments. The hardware element may include an integrated circuit or a system-on-a-chip, an ASIC, a field programmable gate array (FPGA), a complex programmable logic device (CPLD), and another implementation in silicon or a component of another hardware device. In such a context, the hardware element may be used as a processing device for executing program tasks defined by the instructions, modules and/or logic embodied by the hardware element, and a hardware device for storing instructions for execution, for example, the computer-readable storage medium described above.

The foregoing combination may also be used for implementing the various technologies and modules described therein. Therefore, the software, the hardware or the program modules and other program modules may be implemented as one or more instructions and/or logic embodied by one or more hardware elements 914 in a specific form of computer-readable storage medium. The computing device 910 may be configured to implement specific instructions and/or functions corresponding to software and/or hardware modules. Therefore, for example, the computer-readable storage medium and/or the hardware element 914 of the processing system may be configured to at least partially implement, in a form of hardware, the module as a module executable by the computing device 910 as software. The instructions and/or functions may be executable/operable by one or more products (for example, one or more computing devices 910 and/or processing systems 911) to implement the technologies, modules, and examples described herein.

In various implementations, the computing device 910 may have various different configurations. For example, the computing device 910 may be implemented as a computer-type device such as a personal computer, a desktop computer, a multi-screen computer, a laptop computer, or a netbook. The computing device 910 may further be implemented as a mobile apparatus-type device including a mobile device such as a mobile phone, a portable music player, a portable game device, a tablet computer, a multi-screen computer, or the like. The computing device 910 may also be implemented as a television-type device, including a device with or connected to a generally larger screen in a casual viewing environment. The devices include a television, a set-top box, a game console, and the like.

The technologies described herein may be supported by the various configurations of the computing device 910 and are not limited to specific examples of the technologies described herein. The functions may also be implemented completely or partially on a "cloud" 920 by using a distributed system such as through a platform 922 as described below.

The cloud 920 includes and/or represents the platform 922 for resources 924. The platform 922 abstracts underlying functions of hardware (for example, a server) and software resources of the cloud 920. The resources 924 may include applications and/or data that can be used when computer processing is performed on a server remote from the computing device 910. The resources 924 may further include a service provided through the Internet and/or through a subscriber network such as a cellular or a Wi-Fi network.

The platform 922 may abstract resources and functions to connect the computing device 910 to another computing device. The platform 922 may further be configured to abstract classification of the resources to provide a corresponding level of classification of requirements encountered for the resources 924 that is implemented through the platform 922. Therefore, in an embodiment of interconnection devices, implementations of the functions described herein may be distributed throughout the system 900. For example, the functions may be partially implemented on the computing device 910 and through the platform 922 that abstracts the functions of the cloud 920.

It is to be understood that, for clarity, the embodiments of the present disclosure are described with reference to different functional modules. However, apparently, without departing from the embodiments of the present disclosure, functionality of each functional module may be implemented in a single module, implemented in a plurality of modules, or implemented as a part of other functional modules. For example, the functionality described as being performed by the single module may be performed by a plurality of different modules. Therefore, a reference to a specific functional module is only considered as a reference to an appropriate module for providing the described functionality, rather than indicating a strict logical or physical structure or organization. Therefore, the embodiments of the present disclosure may be implemented in the single module, or may be physically and functionally distributed between different modules and circuits.

It is to be understood that although terms such as first, second, and third used in this specification may be used for describing various devices, elements, or components, the devices, the elements, or the components are not limited by the terms. The terms are used only for distinguishing one device, element, or component from another device, element, or component.

Although the embodiments of the present disclosure have been described with reference to some embodiments, the embodiments of the present disclosure are not intended to be limited to specific forms described in this specification. Rather, the scope of the embodiments of the present disclosure is merely limited by the appended claims. Additionally, although individual features may be included in different claims, these may possibly be advantageously combined, and a combination, which does not imply features, included in different claims is not feasible and/or advantageous. The order of the features in the claims does not imply any specific order in which the features need to work. In addition, in the claims, the word "comprising" does not exclude other elements, and the indefinite article "a" or "an" does not exclude a plurality of elements. Reference numerals in the claims are provided as clear examples only and shall not be construed as limiting the scope of the claims in any manner.

What is claimed is:

1. A language sequence labeling method, performed by a computing device, comprising:
 reading a first embedding representation of a language sequence, the first embedding representation comprising a character-level word embedding representation, a pre-trained word embedding representation, and a global word embedding representation of the language sequence, the global word embedding representation referring to a global context representation of the language sequence;
 performing first depth transformation (DT) encoding on the first embedding representation based on a first DT recurrent neural network (RNN), to output a first hidden-layer state representation corresponding to each word in the language sequence; and
 decoding the first hidden-layer state representations of the language sequence, to obtain a labeling result of one or more elements in the language sequence.

2. The method according to claim 1, further comprising:
 reading a second embedding representation of the language sequence, the second embedding representation comprising the character-level word embedding representation and the pre-trained word embedding representation; and
 performing second DT encoding on the second embedding representation based on a second DT RNN, to obtain the global word embedding representation.

3. The method according to claim 2, further comprising:
 performing information aggregation on a result obtained after the second DT encoding, to obtain the global word embedding representation.

4. The method according to claim 1, wherein the performing first DT encoding on the first embedding representation based on a first DT RNN, to output a first hidden-layer state representation corresponding to each word in the language sequence comprises:
 performing the first DT encoding on the first embedding representation in forward and reverse directions respectively; and
 concatenating DT encoding results obtained in the forward and reverse directions, to obtain the first hidden-layer state representation corresponding to the each word.

5. The method according to claim 1, further comprising:
 constructing the first DT RNN by using a linear transformation enhanced gated recurrent unit (L-GRU) and a transition gated recurrent unit (T-GRU).

6. The method according to claim 5, wherein the first DT RNN comprises one layer of L-GRUs and at least two layers of T-GRUs.

7. The method according to claim 1, wherein the decoding the first hidden-layer state representation, to obtain a labeling result of one or more elements in the language sequence comprises:
 performing, for the each word, DT on the first hidden-layer state representation of the word based on a third DT RNN, to obtain a second hidden-layer state representation; and
 obtaining the labeling result based on the second hidden-layer state representation.

8. The method according to claim 7, wherein the performing DT on the first hidden-layer state representation of the word comprises: performing unidirectional DT.

9. The method according to claim 7, wherein the obtaining the labeling result of the language sequence based on the second hidden-layer state representation comprises:
 presetting a plurality of labels; and
 performing linear transformation on the second hidden-layer state representation and label information at a previous moment, to obtain a probability that the word belongs to each label.

10. The method according to claim 3, wherein the information aggregation comprises average pooling or maximum pooling.

11. A language sequence labeling apparatus, comprising a processor and a memory storing a computer program, the computer program being configured to, when executed on the processor, cause the processor to:
 read a first embedding representation of a language sequence, the first embedding representation comprising a character-level word embedding representation, a pre-trained word embedding representation, and a global word embedding representation of the language sequence, the global word embedding representation referring to a global context representation of the language sequence;
 perform first DT encoding on the first embedding representation based on a first DT recurrent neural network (RNN), to output a first hidden-layer state representation corresponding to each word in the language sequence; and
 decode the first hidden-layer state representations of the language sequence, to obtain a labeling result of one or more elements in the language sequence.

12. The apparatus according to claim 11, wherein the computer program further cause the processor to:
 obtain the global word embedding representation, and comprising:
 read a second embedding representation of the language sequence, the second embedding representation comprising the character-level word embedding representation and the pre-trained word embedding representation; and
 perform second DT encoding on the second embedding representation based on a second DT RNN, to obtain the global word embedding representation.

13. The apparatus according to claim 12, wherein the computer program further cause the processor to:
 perform information aggregation on a result obtained after the second DT encoding, to obtain the global word embedding representation.

14. The apparatus according to claim 11, wherein the computer program further cause the processor to perform the first DT encoding on the first embedding representation in forward and reverse directions respectively; and concatenate DT encoding results obtained in the forward and reverse directions, to obtain the first hidden-layer state representation corresponding to the each word.

15. The apparatus according to claim 11, wherein the computer program further cause the processor to:
 construct the first DT RNN by using a linear transformation enhanced gated recurrent unit (L-GRU) and a transition gated recurrent unit (T-GRU).

16. The apparatus according to claim 15, wherein the first DT RNN comprises one layer of L-GRUs and at least two layers of T-GRUs.

17. The apparatus according to claim 11, wherein the computer program further cause the processor to:

perform, for the each word, DT on the first hidden-layer state representation of the word based on a third DT RNN, to obtain a second hidden-layer state representation; and obtain the labeling result based on the second hidden-layer state representation.

18. The apparatus according to claim 17, wherein the computer program further cause the processor to:

preset a plurality of labels, wherein perform linear transformation on the second hidden-layer state representation and label information at a previous moment, to obtain a probability that the word belongs to each label.

19. The apparatus according to claim 13, wherein the information aggregation comprises average pooling or maximum pooling.

20. A non-transitory computer-readable storage medium, storing computer program instructions, the computer program instructions, when executed by a processor, causing the processor to perform:

reading a first embedding representation of a language sequence, the first embedding representation comprising a character-level word embedding representation, a pre-trained word embedding representation, and a global word embedding representation of the language sequence, the global word embedding representation referring to a global context representation of the language sequence;

performing first depth transformation (DT) encoding on the first embedding representation based on a first DT recurrent neural network (RNN), to output a first hidden-layer state representation corresponding to each word in the language sequence; and decoding the first hidden-layer state representations of the language sequence, to obtain a labeling result of one or more elements in the language sequence.

* * * * *